US005171114A

United States Patent [19]

Dunn

[11] Patent Number: 5,171,114

[45] Date of Patent: Dec. 15, 1992

[54] EXPANDABLE LOAD SPACER

[75] Inventor: George D. Dunn, Fort Smith, Ark.

[73] Assignee: Union Camp Corporation, Wayne, N.J.

[21] Appl. No.: 735,966

[22] Filed: Jul. 25, 1991

[51] Int. Cl.$^5$ ......................... B61D 45/00; B32D 3/12

[52] U.S. Cl. ...................................... 410/154; 428/12; 428/116; 428/118; 206/593; 206/814

[58] Field of Search ....................... 410/154, 121, 122; 428/116, 118, 73, 12; 206/583, 814, 593, 524, 521, 516; 229/120.05, 919

[56] References Cited

U.S. PATENT DOCUMENTS

| | | | |
|---|---|---|---|
| 2,986,573 | 4/1961 | Clifford | 410/154 X |
| 3,618,535 | 11/1971 | Hees | 410/154 |
| 3,823,675 | 7/1974 | Farley | 410/154 |
| 3,854,426 | 12/1974 | Kinnune | 410/154 |
| 3,862,607 | 1/1975 | Loudin | 410/154 X |
| 4,109,587 | 8/1979 | Jansen | 410/154 |
| 4,139,146 | 2/1979 | Bamburg et al. | 229/919 X |
| 4,349,303 | 9/1982 | Liebel et al. | 410/154 |
| 4,372,717 | 2/1983 | Sewell et al. | 410/154 |
| 4,516,891 | 5/1985 | Wnuk | 410/154 |
| 4,865,889 | 9/1989 | Boyse | 410/154 X |
| 5,062,751 | 11/1991 | Liebel | 410/154 |

*Primary Examiner*—Michael S. Huppert
*Assistant Examiner*—James T. Eller
*Attorney, Agent, or Firm*—William K. Wissing

[57] ABSTRACT

An expandable load spacer having a suspension strip fixedly attached to a generally honeycomb, cellular void filler is disclosed for use between stacks of articles of freight in, for example, rail cars and other shipping vehicles or containers. The load spacer substantially eliminates the hour glass effect generally experienced in suspended dunnage devices, while at the same time significantly reducing the amount of sheet material required in the manufacture of those load spacers.

17 Claims, 4 Drawing Sheets

EXPANDABLE LOAD SPACER

FIELD OF THE INVENTION

The present invention relates to dunnage devices, and more particularly to expandable load spacers.

BACKGROUND OF THE INVENTION

Frequently, upon the loading of rail cars or other shipping vehicles or containers, voids remain between adjacent stacks of goods or between the stacks of goods and walls of the shipping containers. In order to prevent the load of goods from being damaged due to shifting during transit, void fillers, or dunnage devices as they are commonly referred to, are used to fill these voids. One such void filler commonly used is a honeycomb or cellular structure which is compressible into a short stack for storage and expandable into an elongated array for actual use. The cellular structure is typically manufactured from rectangular strips of sheet material, such as corrugated paperboard. Examples of this type of void filler may be found in U.S. Pat. Nos. 3,862,607, 3,842,757, 3,823,675, 3,618,535 and 3,593,671. Additionally, the void filler will have attached thereto a suspension member, with the ends of the suspension member extending laterally beyond the planar sides of the void filler. Examples of such suspension members may be found in U.S. Pat. Nos. 3,618,535, 3,593,671, 3,842,757, 3,862,607 and 3,823,675.

A major problem associated with the cellular-structured void fillers of the prior art is the so-called "hour glass" effect. When such a filler is suspended to extend downwardly under its own weight, the manner in which the void filler is attached to the suspension member tends to distort the upper and median portions, allowing the cells to either elongate excessively in a vertical direction or to sag about an axis normal to the facing of the cellular void fillers. The result is that the void filler assumes an hour glass shape, thereby creating voids into which the load of goods may shift. Additionally, such excessive distortion may cause the lower portion of the void filler to distort and retract, such that the overall vertical drop of the void filler may be reduced by up to 20% or more. As a result, excess material must be used in the manufacture of the cellular void filler in order to maintain adequate void filling capacity.

Numerous suggestions have been proposed in the prior art to alleviate the "hour glass" problem. In U.S. Pat. No. 3,593,671, transverse rigid members in certain of the cells were proposed to limit their horizontal contraction and prevent the honeycomb structure from sagging unduly. In U.S. Pat. No. 4,007,309, it was proposed to replace some of the freely foldable strips of material normally used to form the honeycomb with relatively stiff strips to resist undue vertical elongation of the cells of an expandable honeycomb structure. U.S. Pat. No. 4,349,303 discloses a suspension system comprising spaced, elongated, rigid suspension members which are woven through the upper two layers of the structure. The ends of the suspension members project laterally past the planar sides of the structure and are adapted to rest on the tops of articles of freight on opposite sides of the space filled by the load spacer. In U.S. Pat. No. 4,372,717, an intricate cellular void filler is disclosed wherein a plurality of horizontal cell rows, each containing a central diamond-shaped cell straddled by a pair of square-shaped cells, are stacked in vertical relation. Vertically adjacent corners and apexes of the cells are interconnected so as to allow vertical expansion of the suspended cellular array under its own weight.

The devices proposed in the prior art to eliminate the hour glass effect all have one thing in common in that all involve intricate designs and construction of the basic honeycomb cellular-structured void filler. However, there continues to be a long felt need in the field of dunnage devices for a simplified, economical, expandable load spacer which eliminates the hour glass effect. Furthermore, there is a long felt need for a simplified, economical, expandable load spacer which reduces the amount of material required to manufacture the load spacer. Heretofore, the dunnage devices of the prior art have not fulfilled these needs.

Other U.S. patents relating to the general field of dunnage devices are U.S. Pat. No. 2,980,573 issued to Clifford, entitled "Ventilated Honeycomb"; U.S. Pat. No. 3,501,367 issued to Parker, entitled "Honeycomb Core Structure"; U.S. Pat. No. 3,700,522 issued to Wonderly, entitled "Process of Making Honeycomb Panels"; U.S. Pat. No. 4,130,682 issued to Lauko, entitled "Sound Absorbing Device"; and U.S. Pat. No. 4,300,864 issued to Liebel et al., entitled "Freestanding Honeycomb Load Spacer."

SUMMARY OF THE INVENTION

The expandable load spacer of the present invention includes a cellular void filler having a suspension strip secured thereto by a securing means such as, for example, an adhesive. The suspension strip has substantially horizontal and parallel top and bottom planar surfaces, extends laterally beyond the planar sides of the void filler, and has a plurality of spaced, repeating patterns of a first panel integrally connected to a second panel at a first fold line, said second panel being integrally connected to a third panel at a second fold line, said third panel being integrally connected to a fourth panel at a third fold line, which second fold line is substantially parallel to and equidistant from both said first and third fold lines.

Upon compression of the suspension strip longitudinally, the second and third panels converge one upon the other at the first and third fold lines and diverge from the top planar surface at the second fold line, thereby converting the strip such that the spaced, repeating pattern is one in which the first panel is substantially horizontal; the second panel extends upwardly from and is substantially normal to the first panel; the third panel, extending upwardly from the fourth panel of the strip, is substantially parallel to and adjacent the second panel; and the fourth panel, being in the same plane as the first panel, is substantially normal to the second and third panels. The converted suspension strip also contains means for maintaining the second panel substantially parallel to and adjacent the third panel.

The load spacers of the present invention substantially eliminate the hour glass effect described above, and significantly reduce the amount of sheet material required for the manufacture of the load spacers. Other objectives, embodiments and advantages of the present invention will become apparent to one of ordinary skill in the art from the detailed description and claims contained herein.

DETAILED DESCRIPTION OF THE INVENTION

The cellular void filler used in the load spacers of the present invention is generally an expandable and contractible honeycomb structure made from rectangular strips of sheet material such as double-faced corrugated paperboard. The void filler is constructed from a stack of rectangular strips which are secured to adjacent strips at spaced and staggered positions such that the strips define the honeycomb structure having a plurality of cells when expanded. The use of such void fillers as dunnage devices and the construction of such void fillers is generally conventional and known to one of ordinary skill in the art.

Figure 1:
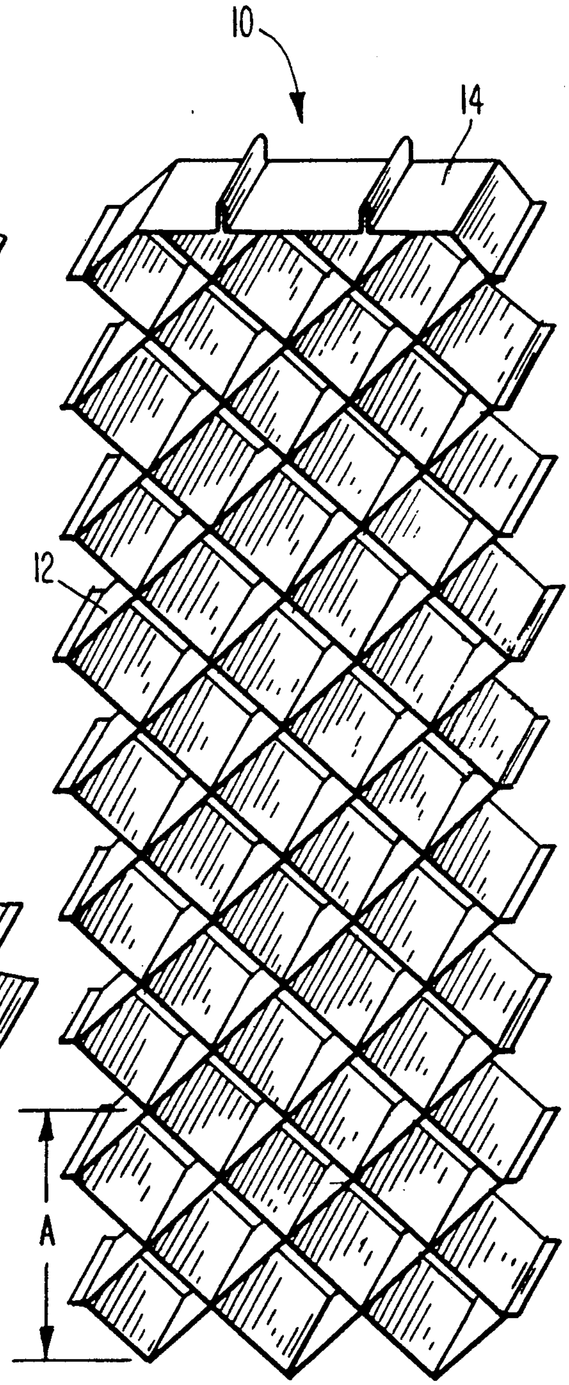
FIG. 1 is a perspective view of one embodiment of a load spacer of the present invention.

As shown in FIG. 1, the load spacer 10 of the present invention is comprised of a void filler 12, a suspension strip 14 and means for securing the suspension strip 14 to the void filler 12. The securing means may be, for example, an adhesive material disposed between the suspension strip 14 and the void filler 12. One skilled in the art will recognize that other attaching means such as tape, staples, and the like, may be used alternately.

Figure 2:
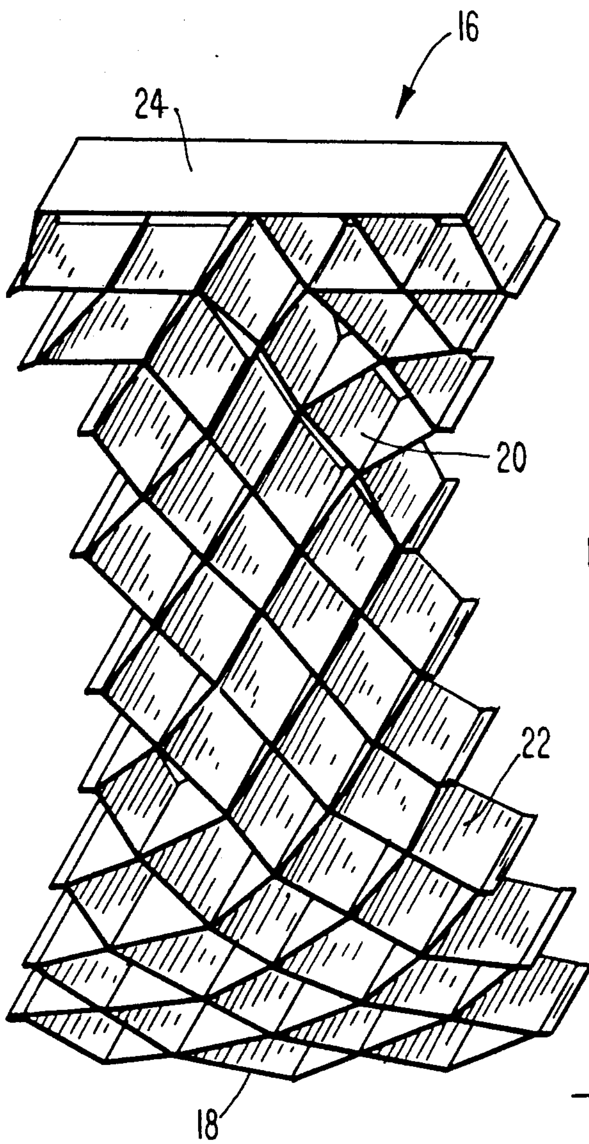
FIG. 2 is a perspective view of a prior art load spacer.

Referring to FIG. 2, a perspective view of a prior art load spacer 16 is shown. Due to the construction of the corrugated material, the void filler 18 is resistant to distortion from forces applied normal to the facing 20 of the void filler, yet prone to extensive distortion from forces applied normal to the side 22 of the void filler. As the rows of cells closest to the suspension strip 24 distort as illustrated, the row of cells in the mid-portion of the void filler 18 elongate and the rows of cells farthest from the suspension strip 24 are drawn upwardly, thereby reducing the overall vertical drop of the void filler and producing the hour glass effect described above. In comparing FIGS. 1 and 2, one notes that the load spacer of the present invention 10 substantially eliminates the hour glass effect present in the prior art load spacer 16. Furthermore, the amount of material which could be saved in manufacturing a load spacer of the present invention 10 having a vertical drop comparable to that of the prior art load spacer 16 is represented by the distance A in FIG. 1.

Figure 3:
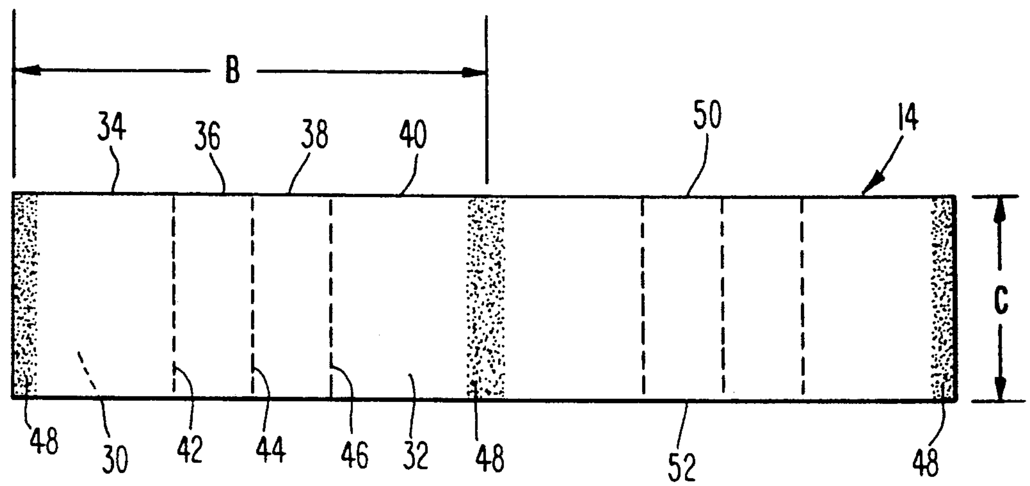
FIG. 3 is a bottom plan view of the suspension strip used in one embodiment of the present invention.

Referring to FIG. 3, a bottom plan view of a suspension strip used in one embodiment of the present invention is shown, wherein like numbers refer to like elements. The suspension strip 14 has a top planar surface 30 and a bottom planar surface 32 which are horizontal and substantially parallel to each other. The strip comprises a plurality of spaced, repeating patterns B wherein a first panel 34 is integrally connected to a second panel 36 at a first fold line 42. The second panel 36 is integrally connected to a third panel 38 at a second fold line 44. The third panel 38 is integrally connected to a fourth panel 40 at a third fold line 46. The second fold line 44 is substantially parallel to and equidistant from both the first 42 and third 46 fold lines.

As used herein, "fold line" refers to a physical alteration of the suspension strip which provides a weakened area or line extending across the width C of the strip. The fold lines are preferably made by die cutting and may be, for example, perforations (as shown in FIG. 3), continuous indentations, or at least one notch (not shown), preferably cut along the front 50 and/or rear 52 edges of the suspension strip 14. The fold lines may be disposed on the top 30 or bottom 32 planar surfaces, or may extend throughout the depth of the strip in the case of a perforation or notch. Preferably, the fold lines are die-cut into both top 30 and bottom 32 planar surfaces.

Preferably, the suspension strip 14 further includes means for securing the suspension strip 14 to the cellular void filler, such as an adhesive strip 48 disposed on the bottom planar surface 32 of the suspension strip 14. The adhesive may be disposed in any location on the bottom planar surface 32 and may comprise any adhesive material effective to secure the strip 14 to the void filler.

Figure 4:
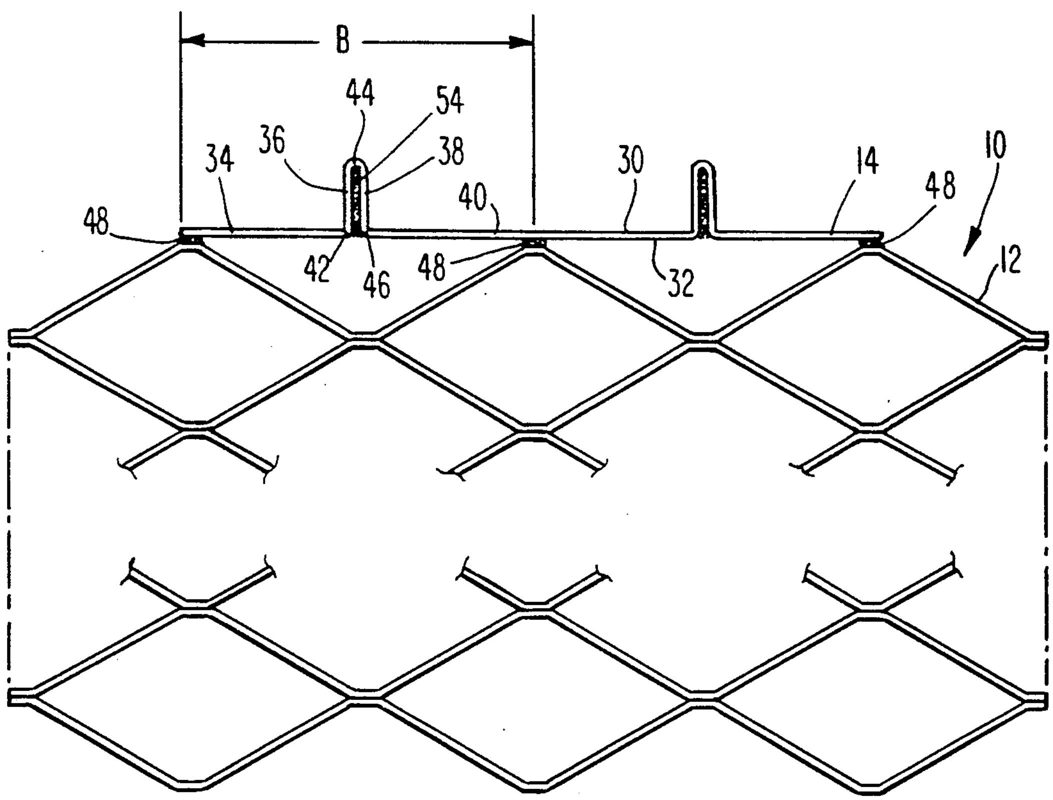
FIG. 4 is a front elevation of the load spacer shown in FIG. 1.

FIG. 4 is a front elevation of the load spacer 10 of FIG. 1, wherein like numbers refer to like elements. When the suspension strip 14 as shown in FIG. 3 is compressed longitudinally, the second 36 and third 38 panels converge at the first 42 and third 46 fold lines and diverge from the top planar surface 30 at the third 44 fold line such that the second 36 and third 38 panels extend upwardly and are substantially parallel to and adjacent one another, both being substantially normal to the first 34 and fourth 40 panels. Means for maintaining the second 36 and third 38 panels substantially parallel to and adjacent one another are used, such as an adhesive 54 as shown. The maintaining means may be such that the second 36 and third 36 panels are fixedly or removably secured one to the other. One skilled in the art will recognize that other maintaining means, such as staples, clips, and the like, may be used alternately. Preferably the second 36 and third 38 panels are removably secured by inter-locking devices.

Inter-locking devices as used herein refers to corresponding structures, preferably located on the second and third panels, whereby when one structure, for example a tab located on the second panel, is interfaced with or inserted into a corresponding structure, for example a notch located in the third panel, the second and third panels are removably secured substantially parallel to and adjacent one another.

Figure 5:
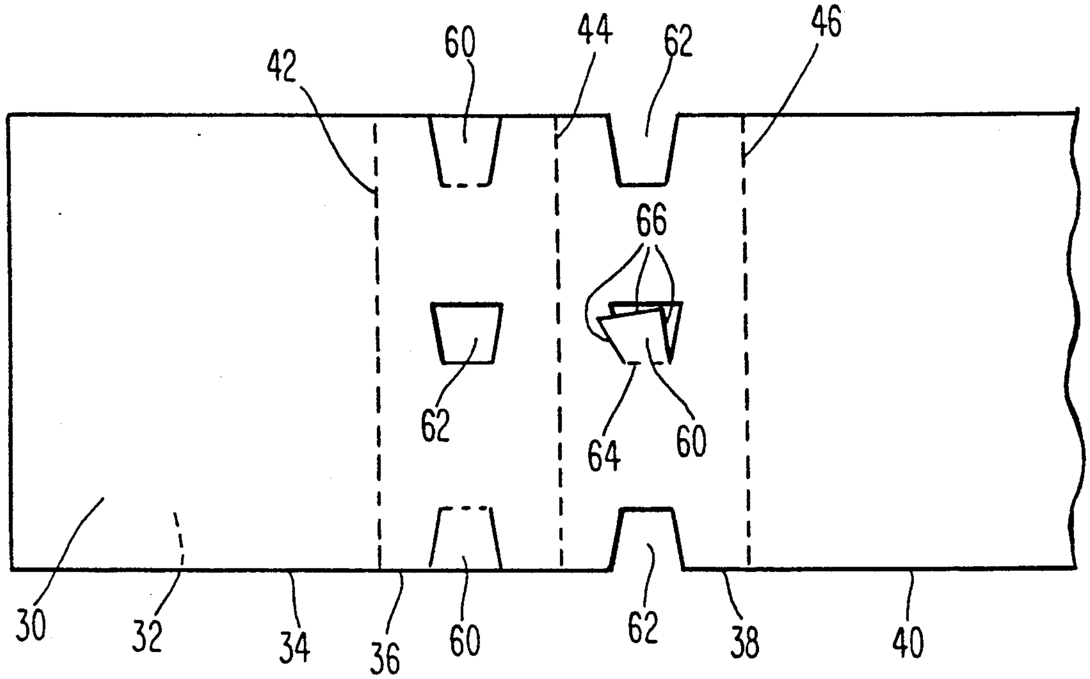
FIG. 5 is a top plan view of a repeating pattern used in one preferred embodiment of the suspension strip of the present invention.
Figure 6:
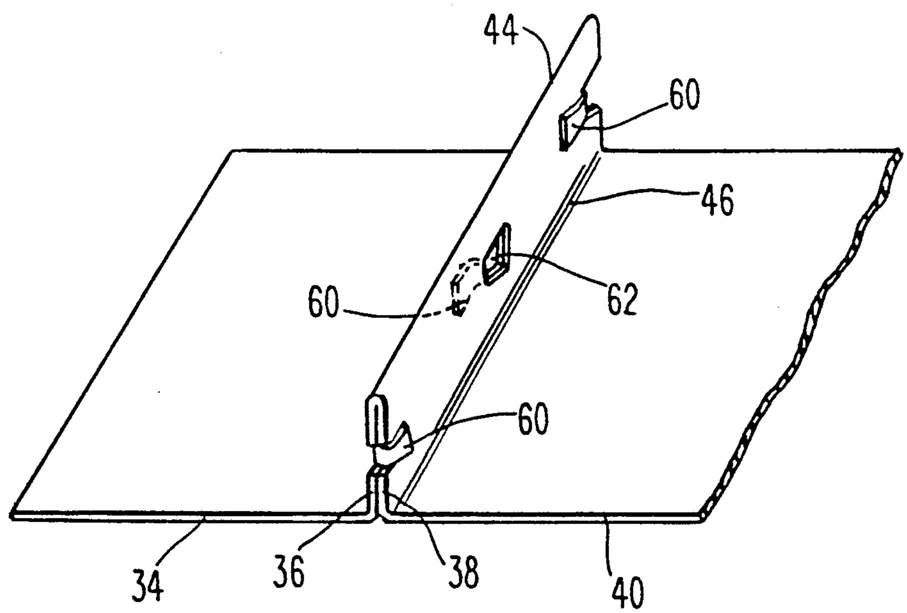
FIG. 6 is a perspective view of a converted repeating pattern such as is shown in FIG. 5.

FIG. 5 is a top plan view of a preferred embodiment of the suspension strip 14 of FIG. 3 wherein like numbers refer to like elements, said strip 14 further comprising an inter-locking device for maintaining the second 36 and third 38 panels substantially parallel to and adjacent one another upon conversion (as described previously). As shown therein, the second 36 and third 38 panels comprise a plurality of tabs 60 and corresponding notches 62. For purposes of illustration, tab 60 in the third panel 38 is shown slightly lifted to show that it, like all tabs shown, is integrally connected to the panel along one edge 64 and severed from the panel along the remaining three edges 66. While the tabs 60 and notches 62 are shown in their respective locations, they may be placed in any locations which are effective to secure the second panel 36 adjacent the third panel 38 when the suspension strip 14 is converted. When the suspension strip of FIG. 5 is converted (FIG. 6), tabs 60 are inserted into notches 62 to form the means for maintaining the second panel 36 substantially parallel to and adjacent the third panel 38.

Figure 7:
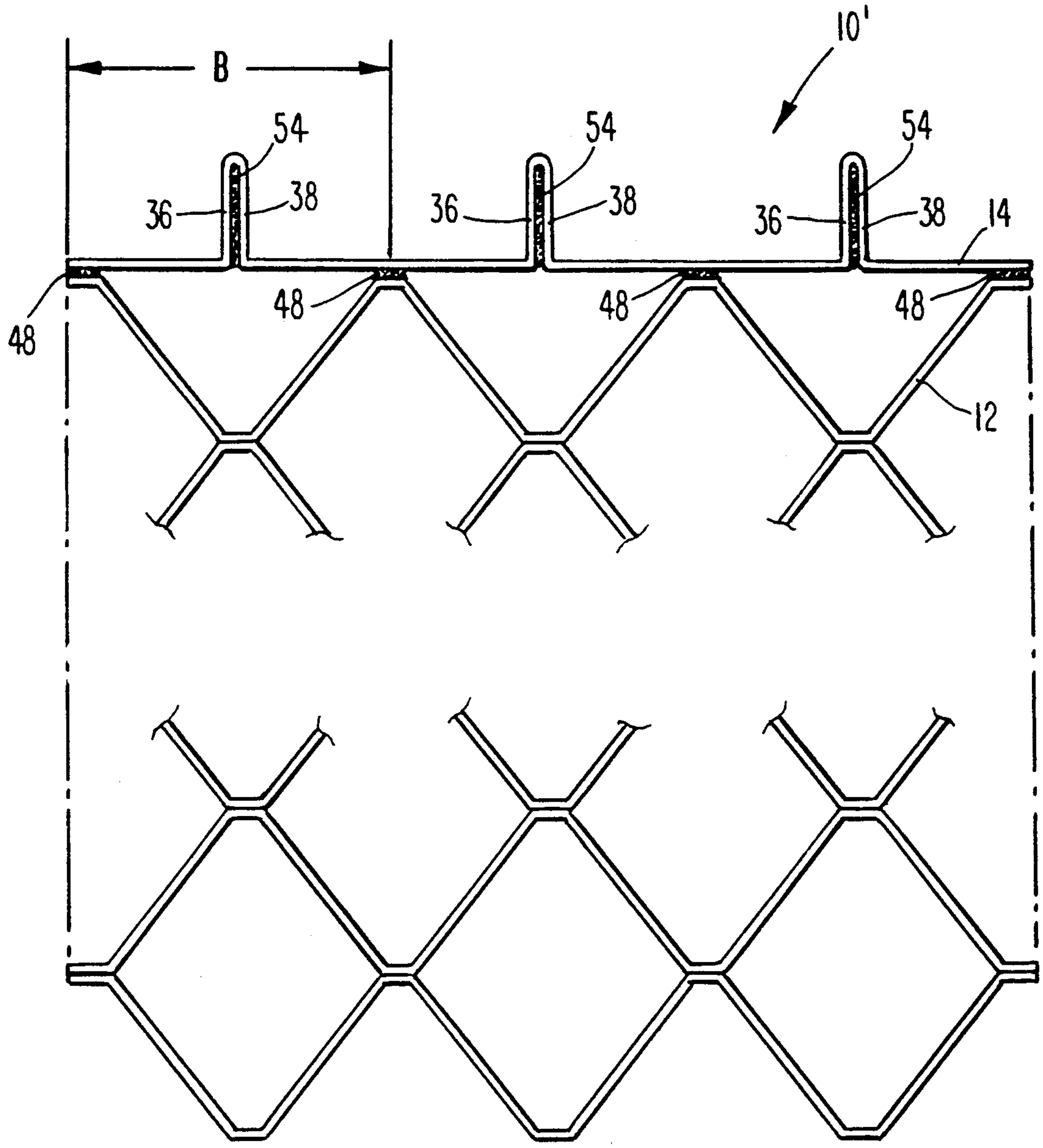
FIG. 7 is a front elevation of a second embodiment of the present invention.

FIG. 7 is a front elevation of a second embodiment of the load spacer 10' of the present embodiment of invention, wherein like numbers refer to like elements. In this embodiment, the suspension strip 14 is secured to the void filler 12 by adhesive strips 48 located approximately equidistant from the repeating, secured, adjacent second 36 and third 38 panels. The embodiment shown in FIG. 7 allows an odd number of corrugated sheets to be removed from the void filler; while the embodiment shown in FIG. 4 allows an even number of corrugated sheets to be removed from the void filler.

The load spacers of the present invention substantially eliminate the hour glass effect of the prior art load spacers, while at the same time significantly reducing the amount of material required in the manufacture of the load spacers of the present invention. The figures and descriptions contained herein are intended to describe and not limit the scope of the present invention. One skilled in the art will recognize that there may exist other embodiments not shown herein which fall within the true scope and spirit of the appended claims.

What is claimed is:

1. An expandable load spacer, comprising:
a cellular void filler;
a suspension strip secured to said void filler; and
means for securing said suspension strip to said void filler,
said suspension strip having substantially parallel top and bottom planar surfaces and a plurality of spaced, repeating patterns of:
a first panel integrally connected to a second panel at a first fold line,
said second panel being integrally connected to a third panel at a second fold line,
said third panel being integrally connected to a fourth panel at a third fold line,
said second fold line being substantially parallel to and equidistant from both said first and third fold lines; and
attaching means for attaching and maintaining said second panel substantially parallel and adjacent to said third panel;
whereby said suspension strip is constructed to longitudinally contract during deployment of the load spacer and be retained in the contracted position, thereby preventing the load spacer from hourglassing after hanging.

2. The load spacer of claim 1 wherein the means for securing said suspension strip to said void filler is selected from the group consisting of adhesives, tapes and staples.

3. The load spacer of claim 1 wherein said cellular void filler is a honeycomb structure.

4. The load spacer of claim 1 wherein said fold lines are disposed on said top planar surface.

5. The load spacer of claim 1 wherein said fold lines are disposed on said bottom planar surface.

6. The load spacer of claim 1 wherein said fold lines are disposed on both said top and said bottom planar surfaces.

7. The load spacer of claim 1 wherein said fold lines are perforations.

8. The load spacer of claim 1 wherein said fold lines are continuous indentations.

9. An expandable load spacer according to claim 1, wherein said attaching means comprises an adhesive.

10. An expandable load spacer according to claim 1, wherein said attaching means comprises a tab on one of said second and third panels and a mating notch on the other of said second and third panels.

11. An expandable load spacer, comprising:
a cellular void filler;
a suspension strip secured to said void filler; and
means for securing said suspension strip to said void filler,
said suspension strip comprising a plurality of spaced, repeating patterns of:
a substantially horizontal first panel,
a second panel substantially normal to and integrally connected to said first panel at a first fold line, said second panel extending upwardly from said first panel,
a third panel substantially parallel to and adjacent said second panel, said third panel integrally connected to said second panel at a second fold line located at the apex of each said second and third panels,
a fourth panel substantially normal to and integrally connected to said third panel at a third fold line,
attaching means for attaching and maintaining said second panel substantially parallel to and adjacent said third panel, and
said first and fourth panels and said first and third fold lines being in the same plane.

12. The load spacer of claim 11 wherein the means for securing said suspension strip to said void filler is selected from the group consisting of adhesives, tapes and staples.

13. The load spacer of claim 11 wherein said cellular void filler is a honeycomb structure.

14. The load spacer of claim 11 wherein said fold lines are perforations.

15. The load spacer of claim 11 wherein said fold lines are continuous indentations.

16. An expandable load spacer according to claim 11, wherein said attaching means comprises an adhesive.

17. An expandable load spacer according to claim 11, wherein said attaching means comprises a tab on one of said second and third panels and a mating notch on the other of said second and third panels.

* * * * *